United States Patent [19]

Yamamoto et al.

[11] Patent Number: 4,484,413
[45] Date of Patent: Nov. 27, 1984

[54] CONTROL APPARATUS FOR A GRINDING MACHINE

[75] Inventors: Katsumi Yamamoto, Takahama; Yuichiro Komatsu; Ikurou Hamada, both of Kariya, all of Japan

[73] Assignee: Toyoda Koki Kabushiki Kaisha, Kariya, Japan

[21] Appl. No.: 488,806

[22] Filed: Apr. 26, 1983

[30] Foreign Application Priority Data

May 3, 1982 [JP] Japan ................................ 57-74165

[51] Int. Cl.³ .............................................. B24B 5/42
[52] U.S. Cl. .............................. 51/165.71; 51/105 R; 364/474
[58] Field of Search .......... 51/105 R, 165 TP, 165.71, 51/165 R; 364/474

[56] References Cited

U.S. PATENT DOCUMENTS

| | | | |
|---|---|---|---|
| 4,018,010 | 4/1977 | Pozzetti | 51/165.71 |
| 4,214,309 | 7/1980 | Hoide | 51/165.71 |
| 4,293,913 | 10/1981 | Nishimura | 364/474 |
| 4,400,781 | 8/1983 | Hotta | 51/165.71 |

Primary Examiner—Harold D. Whitehead
Attorney, Agent, or Firm—Oblon, Fisher, Spivak, McClelland & Maier

[57] ABSTRACT

In a grinding machine having a workpiece drive device for rotating a workpiece about an axis and an infeed device for effecting relative infeed movement between a rotating grinding wheel and the workpiece, a computerized numerical controller is provided with a data input device for inputting a numerical control program for the workpiece and data indicative of the shape of the workpiece for storage in a memory device. A data processor of the controller calculates the rigidity of the workpiece based upon the shape data being stored in the memory device. Further, the data processor modifies by calculation rotational speed data and infeed rate data given in the numerical control program, based upon the calculated rigidity of the workpiece. The modified rotational speed data and the modified infeed rate data are respectively output to the workpiece drive device and the infeed device, so that the grinding condition of the workpiece is modified in accordance with the calculated rigidity of the workpiece.

8 Claims, 5 Drawing Figures

```
N001  S200  M03
N002  G00   XD0
N003  G01   XD1  FS
N004  S100
N005  G01   XD2  FS
N006  G00   X-D4
N007  M00
```

CONTROL APPARATUS FOR A GRINDING MACHINE

BACKGROUND OF THE INVENTION

1. Field of the Invention

The present invention relates in general to a grinding machine of the type wherein a workpiece rotatable about an axis is ground by effecting relative infeed movement between the workpiece and a rotating grinding wheel. More particularly, it relates to a control apparatus for such a grinding machine capable of modifying a grinding condition such as infeed rate of a grinding wheel based upon the rigidity of a workpiece to be ground.

2. Description of the Prior Art

A grinding machine has been known in which the infeed rate of a wheel head rotatably carrying a grinding wheel is controlled to maintain the flexing amount of a workpiece constant. The flexing amount is calculated from the difference between a transient size of the workpiece measured by a sizing device and a transient position of the wheel head. In the grinding machine, the lower the workpiece rigidity is and the more flexible the workpiece is, the slower the infeed rate of the grinding wheel becomes. Thus, it is possible for the grinding machine to precisely machine workpieces without creating any chatter mark, heat-affected layer and the like. However, in order to measure the transient size of a workpiece during a grinding operation, the grinding machine requires the use of a signal output from a measuring head of the sizing device. Therefore, in a dead-stop grinding mode employing no sizing device, such a control method cannot be practiced, and any grinding operation cannot be performed in a condition suitable for the rigidity of any workpiece.

SUMMARY OF THE INVENTION

Accordingly, it is a primary object of the present invention to provide an improved control apparatus for a grinding machine capable of performing a grinding operation in a condition suitable for the rigidity of a workpiece to be ground even in a grinding mode employing no sizing device.

Another object of the present invention is to provide an improved control apparatus for a grinding machine capable of modifying a programmed grinding condition in accordance with the rigidity of a workpiece to be ground.

A further object of the present invention is to provide an improved control apparatus for a grinding machine wherein the infeed amount of a grinding wheel per rotation of a workpiece can be maintained constant irrespective of the infeed rate of the grinding wheel being changed in dependence upon the rigidity of the workpiece.

An additional object of the present invention is to provide an improved control apparatus of the character set forth above which is particularly suited to be embodied by a computerized numerical controller.

Briefly, according to the present invention, there is provided a control apparatus which controls a workpiece drive device for rotating a workpiece about an axis and an infeed device for effecting relative infeed movement between a rotating grinding wheel and the workpiece. The control apparatus comprises a data input device, a calculation device and a modification circuit device. The data input device enables an operator to input data indicative of the shape of a workpiece to be ground. The calculation device calculates the rigidity of the workpiece based upon the input shape data. The modification circuit device is responsive to the calculated workpiece rigidity to modify a standard grinding condition for the workpiece. Preferably, the modification circuit device controls at least one of the workpiece drive device and the infeed device in such a manner that the rotational speed of the workpiece or the infeed rate of the grinding wheel relative to the workpiece is reduced to adapt for the calculated rigidity of the workpiece. With this configuration, the workpiece can be precisely ground even where the rigidity thereof is low. Because the rigidity of the workpiece is obtained by calculation, the use of a sizing device is not required, which makes it possible to practice the present invention in a dead-stop grinding mode employing no sizing device.

In another aspect of the present invention, the modification circuit device calculates a rotational speed of the workpiece which is suitable for the calculated rigidity of the workpiece, and then, calculates the relative infeed rate based upon the calculated rotational speed. Accordingly, the infeed amount of the grinding wheel per rotationa of the workpiece can be maintained constant.

In a specific aspect of the present invention, the calculation device and the modification circuit device are embodied by a numerical controller, which includes a data processor, a memory device and a pulse generating circuit. A numerical control program defining the standard grinding condition is input by the data input device and together with the workpiece shape data, is stored in the memory device. The data processor calculates the rigidity of the workpiece based upon the shape data stored in the memory device and modifies at least one of rotational speed data and infeed rate data which are given in the numerical control program, based upon the calculated workpiece rigidity. The data processor then outputs the modified rotation speed data to the workpiece drive device or the modified infeed rate data to the pulse generating circuit. The pulse generating circuit is thus enabled to distribute feed pulses to the infeed device at a frequnecy coinciding with the modified infeed rate data.

BRIEF DESCRIPTION OF THE ACCOMPANYING DRAWINGS

The foregoing and other objects and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

DETAILED DESCRIPTION OF A PREFERRED EMBODIMENT

Figure 1:
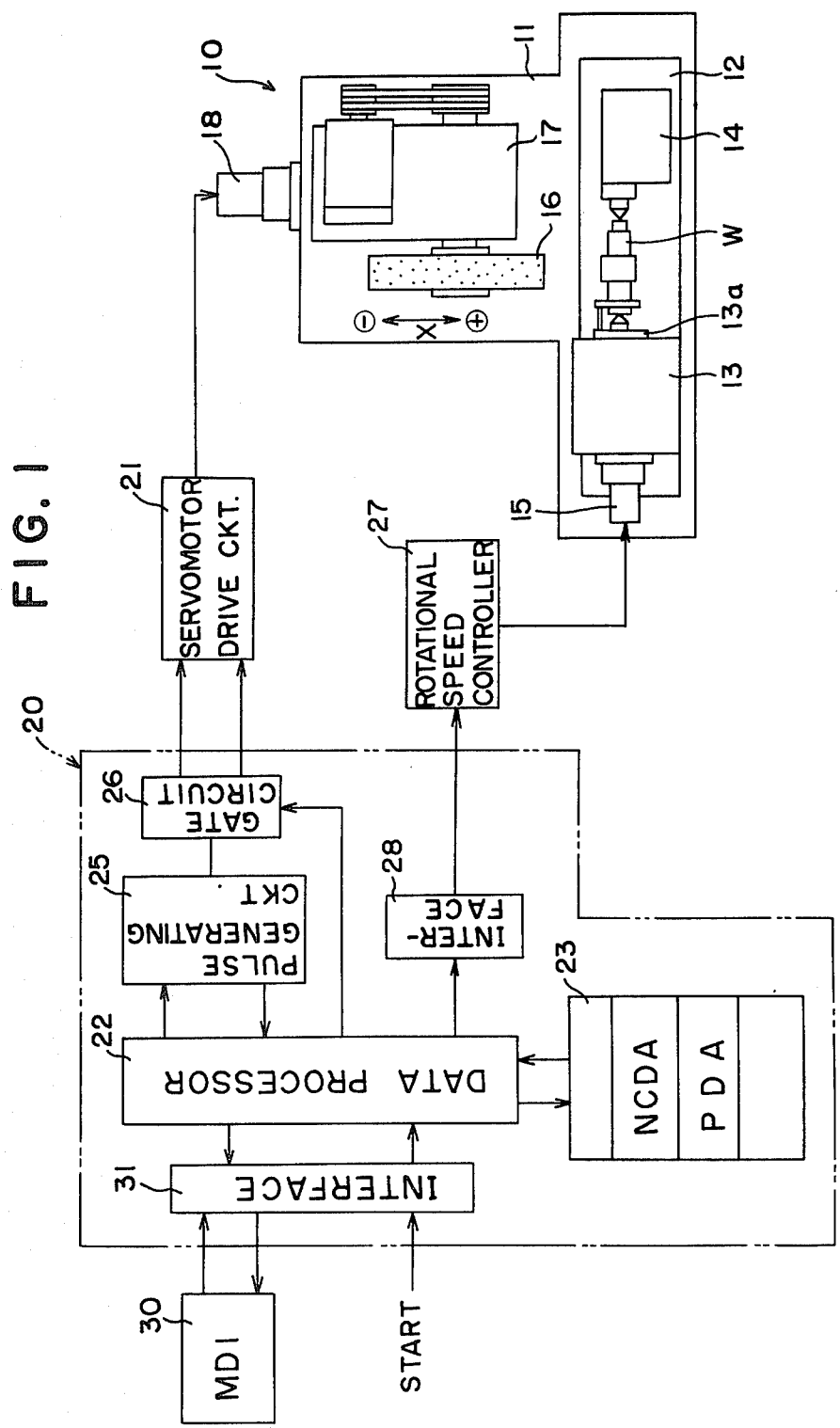
FIG. 1 is a schematic plan view of a grinding machine also showing a block diagram of a control apparatus therefor according to the present invention.

Referring now to the drawings and particularly, to FIG. 1 thereof, a grinding machine 10 is shown having a bed 11, which mounts a work table 12 thereon. A work head 13 and a foot stock 14 are in turn mounted on the work table 12 and cooperate with each other to support a workpiece W therebetween. The workpiece W is rotatable by the rotation of a work spindle 13a drived by a spindle drive motor 15. A wheel head 17 rotatably carrying a rinding wheel 16 is guided on the bed 11 for sliding movement toward and away from the workpiece W and is movable by a servomotor 18.

A reference numeral 20 denotes a numerical controller, which distributes feed pulses to a drive circuit 21 for the servomotor 18 so as to move the wheel head 17. The numerical controller 20 is primarily composed of a data processor 22, a memory device 23, a pulse generating circuit 25 and a gate circuit 26. The numerical controller 20 is connected via an interface 28 to a rotational speed controller 27, which controls the spindle drive motor 15 to rotate the work spindle 13a at a commanded rotational speed given from the data processor 22. Also connected to the data processor 22 via another interface 31 is a manual data input device 30, which enables an operator to write a numerical control program (hereafter referred to as "NC program") and workpiece shape data in the memory device 23.

Figures 2, 3:
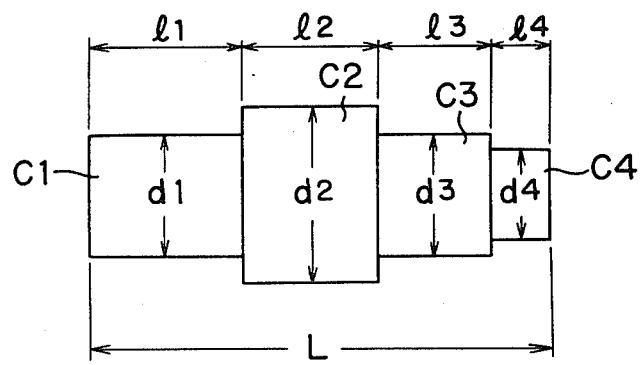
FIG. 2 is an explanatory view of a numerical control program stored in a memory device 23 shown in FIG. 1.
FIG. 3 is an explanatory view illustrating the external shape of a cylindrical workpiece to be ground by the grinding machine.

The NC program used in this particular embodiment is exemplified in FIG. 2. Under this program, the work spindle 13a is first rotated at a speed suitable for rough grinding, whereupon the wheel head 17 and hence, the grinding wheel 16 are advanced a first distance (DO) at a rapid feed rate. The grinding wheel 16 is then advanced a second distance (D1) at a rough grinding infeed rate to perform a rough grinding operation. Subsequently, the rotational speed of the work spindle 13a is reduced to a speed suitable for fine grinding, and the grinding wheel 16 is further advanced a third distance (D2) at a fine grinding infeed rate so as to finely grind the workpiece W.

The NC program so scheduled is input by the data input device 30 to be stored in an NC data area NCDA of the memory device 23. The respective infeed rates of the grinding wheel 16 in the rough grinding and the fine grinding are calculated based upon the rotational speed of the work spindle 13a, as described later in detail. In this connection, the NC program includes prticular F-code data "FS" for instructing such calculation.

The workpiece shape data includes diameters (di) and axial lengthes (li) of a plurality of cylindrical portions C1–C4 which are obtained by dividing the workpiece W in an axial direction thereof, as shown in FIG. 3. Data indicative of the diameters (di) and the axial lengthes (li) are stored in a shape data area PDA of the memory device 23.

Figure 4A:
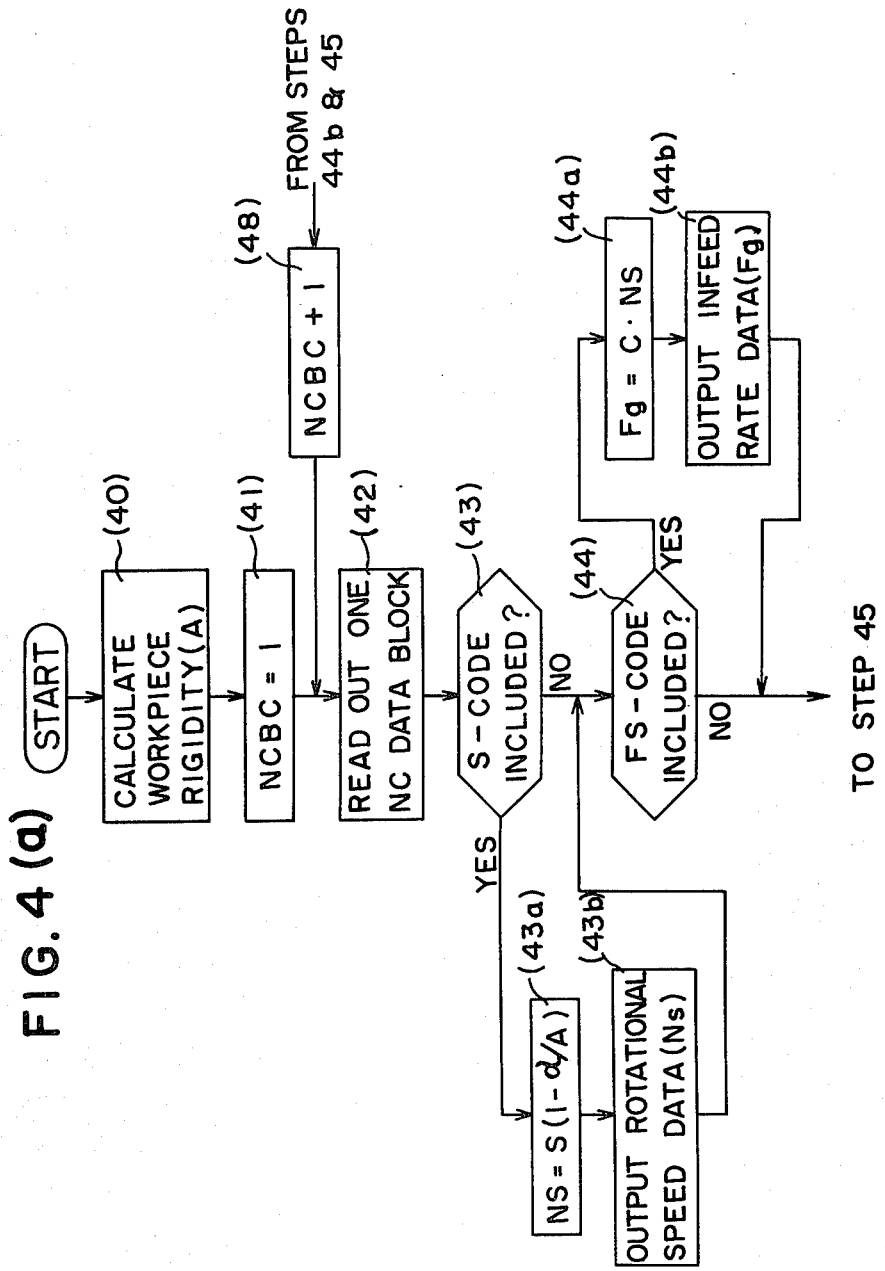
FIGS. 4(a) and 4(b) are flow charts of a system program executed by a data processor 22 shown in FIG. 1.
Figure 4B:
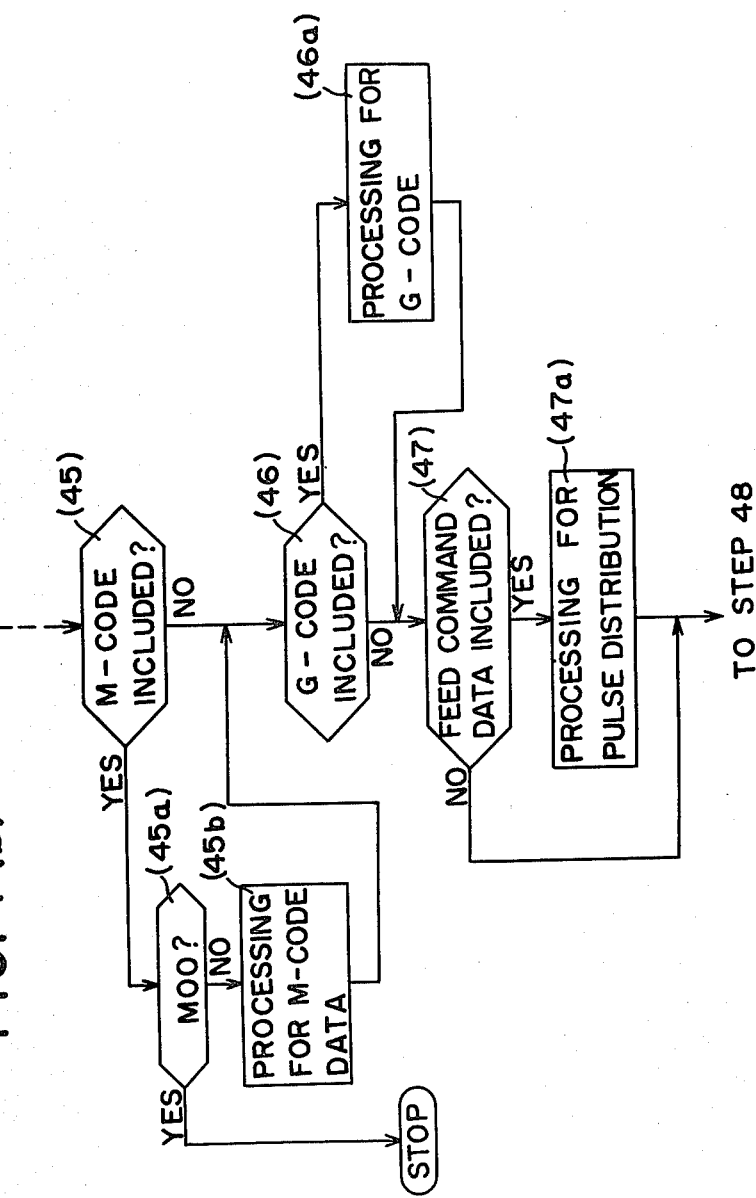

The operation of the data processor 22 will be described hereafter with reference to FIGS. 4(a) and 4(b). When a start command switch provided on a manipulation board, not shown, is depressed, the data processor 22 first executes step 40 to calculate the rigidity (A) of the workpiece W based upon the workpiece shape data. More specifically, the data processor 22 successively reads out data indicative of diameters (di) and axial lengthes (li) which have been input in correspondence respectively to the cylindrical portions C1–C4. The data processor 22 then calculates a cumulative value $$\left( \sum_{i=1}^{n} di \cdot li \right)$$

by successively cumulating respective products (di . li), which are obtained by respectively multiplying the diameters (d1–d4) by the axial lengthes (li–L4) associated thereto and further calculates the entire axial length (L) of the workpiece W by cumulating respective axial lengthes (li–l4) of the cylindrical portions C1–C4. The cumulative value $$\left( \sum_{i=1}^{n} di \cdot li \right)$$

and the entire axial length (L) so calculated are substituted into the following equation (1), whereby an approximate value of the rigidity (A) is obtained.

$$A = \left( \sum_{i=1}^{n} di \cdot li \right) / L^2 \tag{1}$$

Upon completion of the calculation for the rigidity (A), step 41 is then followed, wherein a block counter, not shown, for designating a memory address from which one NC data block is to be read out is initialized: the counter is set to indicate "1". Thereafter, one NC data block whose address is designated by the block counter is read out from the NC data area NCDA of the memory device 23 in step 42, and processings in step 43 and other steps successive thereto are executed with respect to the read-out one NC data block.

As seen in FIG. 2, the NC program stored in the NC data area NCDA includes at a first block "N001" thereof command data "M03" for instructing the roration of the work spindle 13a and command data "S200" for designating a standard or reference rotational speed (S) of the work spindle 13a in rough grinding. Accordingly, when processings are executed in steps following the step 43, a modified rotational speed (Ns) of the work spindle 13a is determined based upon the speed command data "S200" and the calculated workpiece rigidity (A), and the rotation of the work spindle 13a is initiated in response to the rotational command data "M03".

That is, when it is confirmed in step 43 that the S-code data "S200" is included in the first NC data block "N001", the step 43 is followed by step 43a, wherein the modified rotational speed (Ns) of the work spindle 13a is calculated in accordance with the following equation (2).

$$Ns = S(1 - \alpha/A) \tag{2}$$

The reference rotational speed (S) designated in the first NC data block "N001" has been set to be a relatively high speed within a range which is chosen in disregard of the flexing of the workpiece which permits highly efficient grinding without creating any grinding burn, chatter mark and the like on the workpiece W. In step 43a, the reference rotational speed (S) is multiplied by a modifier value $(1-\alpha/A)$ to calculate the modified rotational speed (Ns). The value ($\alpha$) in the modifier value $(1-\alpha/A)$ represents a positive coefficient for speed reduction.

When the calculation of the modified rotational speed (Ns) is completed in the foregoing manner, step 43b is next executed to supply the calculated rotational speed (Ns) to the rotational speed controller 27, and it is confirmed in step 45 that M-code data is given in the first NC data block "N001". The routine of the data processor 22 is then forwarded through step 45a to step 45b, wherein a rotation start command is output to the rotational speed controller 27. Consequently, the spindle drive motor 15 is operated to rotate the workpiece W. It is noted that the workpiece W at this time is rotated not at the reference rotational speed (S) having been designated in the first NC data block "N001", but at the modified rotational speed (Ns) having been reduced in correspondence to the calculated rigidity (A) of the workpiece W.

Because the first NC data block "N001" including no feed command data, the routine of the data processor 22, upon completion of the processing in step 45b, is advanced through steps 46 and 47 to step 48, wherein the content of the block counter NCBC is stepped up. Return is then made to step 42 to read out from the memory device 23 a second NC data block "N002" of a memory address being now designated by the block counter NCBC. Since rapid feed command data "G00" is given in the read-out NC data block, processing is moved from step 42 to step 46 via steps 43, 44 and 45. The given G-code data in the second NC data block is confirmed to be "G00", so that the pulse distribution rate is set to a value coinciding with the rapid feed rate in step 46a. Steps 47 and 47a are executed in succession, and this cuases the pulse generating circuit 25 to distribute feed pulses of the number coinciding with the first distance (DO) designated in the second NC data block, at the set rapid feed rate.

After the grinding wheel 16 reaches the rapid feed end, step 48 is executed to further step up the content of the block counter NCBC, and a third NC data block "N003" is read out in the step 42. Because the data block "N003" including a rough grinding infeed amount (D1) and the particular F-code data "FS" for instructing the calculation of infeed rate, the rough grinding infeed rate of the grinding wheel 16 is calculated, and pulse distribution is effected to advance the grinding wheel 16 the distance (D1) at the calculated rough grinding infeed rate.

More specifically, when it is confirmed in step 44 that the third NC data block "N003" includes the particular F-code data "FS", the routine of the data processor 22 is moved from step 44 to step 44a, wherein the infeed rate (Fg) of the grinding wheel 16 is calculated based upon the following equation (3).

$$Fg = C \cdot Ns \qquad (3)$$

This equation is used for an infeed rate that maintains the infeed amount of the grinding wheel per rotation of the workpiece W constant irrespective of the variation of rotational speed of the workpiece W. The symbole "C" in the equation stands for a constant which determines the infeed amount per rotation of the workpiece W.

The calculated infeed rate (Fg) is set in a pulse distribution data table, not shown, in step 44b. Steps 45–47 are executed to reach step 47a, wherein pulses of the number coinciding with the distance (D1) are distributed. The pulse distribution rate at this time correspondes to the infeed rate (Fg) which has been stored in the pulse distribution data table after calculation by the use of the above-noted equation (3).

Consequently, the wheel head 17 is advanced at the calculated infeed rate (Fg), and the rough grinding of the workpiece W is initiated. The workpiece rotational speed at this time indicates a value to which a programmed reference rotational speed is reduced in accordance with the calculated rigidity (A) of the workpiece W. This advantageously results in automatically reducing the rotational speed of the workpiece W to thereby produce a modified grinding condition in which chatter mark is hardly generated, even in the case where the rigidity of the workpiece W is low to permit chatter mark to be generated thereon. Further, it is generally understood that the reduction of rotational speed of the workpiece W without the reduction of infeed rate of the grinding wheel 16 causes the infeed amount per workpiece rotation to increase, thereby suppressing the radiation of heat generated during grinding, whereby grinding burn is liable to be created. However, according to the present invention, the infeed rate of the grinding wheel 16 is determined based upon the adjusted workpiece rotational speed in such a manner that it is reduced as the rotational speed of the workpiece W is reduced. Therefore, the infeed rate per workpiece rotation is maintained constant even when the rotational speed of the workpiece W is reduced, whereby the workpiece is reliably prevented from sufferring grinding burn, heat-affected layer or the like.

The rough grinding of the workpiece W is performed as described above. When the grinding wheel 16 reaches the end of advance movement through the distance (D1), the pulse distribution for rough grinding is completed to terminate the rough grinding infeed movement. In the case where the rigidity (A) of the workpiece W is low as in the above-described instance, the infeed rate of the grinding wheel 16 and hence, the grinding resistance against the workpiece W are reduced least the workpiece W should be ground while being flexed beyond an allowable amount. This prevents the allowance for successive fine grinding from being removed due to spring-back movement of the workpiece W at the end of rough grinding.

When the rough grinding movement of the grinding wheel 16 according to the N003 NC data block is completed in the foregoing manner, step 48 is next executed to step up the block counter NCBC. Return is them made to step 42, so that a work spindle rotational speed change command given in an NC data block "N004" is read out and executed.

The read-out NC data block "N004" is given as S-code data a reference rotational speed of the work spindle 13a suitable for fine grinding. A new work spindle rotational speed is calculated based upon the reference rotational speed in step 43a and is output to the rotational speed controller 27 in step 43b. Because the reference rotational speed in the fine grinding is chosen to indicate the half value of that in the rough grinding, the execution of the read-out S-code data causes the rotational speed of the workpiece W to be reduced to approximately the half of its previous speed.

When an N005 NC data block is read out subsequently, a pulse distribution speed is calculated in response to the particular F-code data "FS" included in the N005 NC data block in step 44a. As the rotational speed of the work spindle 13a in the fine grinding has been reduced to approximately the half of that in the rough grinding, the pulse distribution rate is reduced to approximately the half of the previous distribution rate in the rough grinding. Thus, the grinding wheel 16 is infed at the rate which is half of that in the rough grinding, whereby the workpiece W is finely ground. Because the rotational speed of the workpiece W is reduced to a sufficiently low value which depends upon the rigidity (A) of the workpiece W, neither chatter mark nor heat-affected layer is produced during the fine grinding. In addition, the infeed rate of the grinding wheel 16 is reduced to the value which makes the infeed amount of the grinding wheel 16 per workpiece rotation constant. This prevents the roundness of the workpiece W from being deteriorated as a result of the workpiece W being ground with abnormal flexing and thus, makes it possible to precisely grind the workpiece W.

In the above-described particular embodiment, both of the rotational speed of the workpiece W and the infeed rate of the grinding wheel 16 are controlled in dependence upon the calculated rigidity (A) of the workpiece W. However, the present invention may otherwise be practiced by controlling only the rotational speed of the workpiece W or the infeed rate of the grinding wheel 16 in dependence upon the calculated rigidity (A) of the workpiece W.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by the Letters Patent of the United States is:

1. A control apparatus for a grinding machine wherein a workpiece is ground by relatively infeeding a rotating grinding wheel against a workpiece rotated about an axis, said control apparatus comprising:
    data input means for inputting data indicative of the shape of said workpiece;
    calculation means for calculating the rigidity of said workpiece based upon said workpiece shape data input by said data input means; and
    modification circuit means responsive to said calculated rigidity of said workpiece for modifying a grinding condition in which said workpiece is ground.

2. A control apparatus as set forth in claim 1, wherein:
    said grinding machine includes workpiece drive means for rotating said workpiece and infeed means for effecting relative infeed movement between said rotating grinding wheel and said workpiece; and
    said modification circuit means modifies in response to said calculated rigidity of said workpiece one of a rotational speed at which said workpiece drive means rotates said workpiece and an infeed rate at which said infeed means effects the relative infeed movement between said rotating grinding wheel and said workpiece.

3. A control apparatus as set forth in claim 2, wherein:
    said modification circuit means modifies in response to said calculated rigidity of said workpiece both of said rotational speed and said infeed rate.

4. A control apparatus as set forth in claim 3, wherein:
    said modification circuit means first calculates a modified rotational speed based upon said calculated rigidity of said workpiece and then, calculates a modified infeed rate based upon said modified rotational speed;
    said workpiece drive means is responsive to said modified rotational speed for rotating said workpiece thereat; and
    said infeed means is responsive to said modified infeed rate for relatively infeeding said rotating grinding wheel and said workpiece thereat.

5. A control apparatus for a grinding machine having workpiece drive means for rotating a workpiece about an axis and infeed means for effecting relative infeed movement between a rotating grinding wheel and said workpiece, said control apparatus comprising:
    data input means for inputting a numerical control program for said workpiece and data indicative of the shape of said workpiece;
    memory means for storing said numerical control program and said workpiece shape data;
    a pulse generating circuit connected to said infeed means for distributing feed pulses to said infeed means at a frequency coinciding with infeed rate data applied thereto;
    a data processor connected to said memory means, said workpiece drive means and said pulse generating circuit for reading out said numerical control program from said memory means and for outputting rotatinal speed data and said infeed rate data given in said numerical control program respectively to said workpiece drive means and said pulse generating circuit, said data processor including:
    calculation means for calculating the rigidity of said workpiece based upon said workpiece shape data stored in said memory means; and
    modification circuit means responsive to said calculated rigidity of said workpiece for modifying at least one of said rotational speed data and said infeed rate data respectively output to said workpiece drive means and said pulse generating circuit.

6. A control apparatus as set forth in claim 5, wherein:
    said modification circuit means modifies both of said rotational speed and said infeed rate based upon said calculated rigidity of said workpiece.

7. A control apparatus as set forth in claim 6, wherein:
    said modification circuit means first calculates one of a modified rotational speed and a modified infeed rate based upon said calculated rigidity of said workpiece and a corresponding one of said rotational speed data and said infeed rate data and then, calculates the other of said modified rotational speed and said modified infeed rate based upon said calculated one of said modified rotational speed and said modified infeed rate and the other corresponding one of said rotational speed data and said infeed rate data.

8. A control apparatus as set forth in claim 1, wherein said workpiece has a plurality of stepped cylindrical portions, and wherein said calculation means calculates said rigidity of said workpiece in accordance with the following equation:

$$A = \left( \sum_{i=1}^{n} di \cdot li \right) / L^2$$

where symbols (di), (li) and (L) respectively denote the diameter of each stepped cylindrical portion, the axial length of each stepped cylindrical portion and the entire axial length of said workpiece.

* * * * *